July 7, 1970  F. BESTENREINER  3,518,928
EXPOSURE CONTROL FOR PHOTOGRAPHIC CAMERAS
Filed June 18, 1968  3 Sheets-Sheet 3

*INVENTOR.*

FRITZ BESTENREINER

BY

United States Patent Office 3,518,928
Patented July 7, 1970

3,518,928
EXPOSURE CONTROL FOR PHOTOGRAPHIC CAMERAS
Fritz Bestenreiner, Gruenwald, near Munich, Germany, assignor to Agfa-Gevaert Aktiengesellschaft, Leverkusen, Germany
Filed June 18, 1968, Ser. No. 738,066
Claims priority, application Germany, June 30, 1967, A 56,133
Int. Cl. G03b 7/08
U.S. Cl. 95—10      20 Claims

ABSTRACT OF THE DISCLOSURE

An exposure control for photographic cameras wherein the shutter is moved to open position on movement of a diaphragm vane from closed position to a given second position in which the diaphragm defines an aperture whose size is a function of scene brightness. The vane returns to closed position with a delay which is a function of the aperture size in the given second position of the vane. A pawl holds the vane in second position and is mounted on an adjusting member which disengages the shutter from a retaining lever when the pawl engages with one of a set of teeth on the vane or its lever so that the shutter is then free to open. The means for moving the vane from closed position comprises an impeller, and the extent of movement of the vane under the action of the impeller is determined by the field of an electromagnet which is in circuit with a photosensitive receiver. The vane carries an auxiliary diaphragm which reduces the amounts of scene light reaching the receiver proportionally with the extent of movement of the vane from closed position, and the thus changed resistance of the receiver determines the exposure time by influencing the delay with which the vane is released for movement back to closed position.

BACKGROUND OF THE INVENTION

The present invention relates to photographic cameras, particularly to improvements in exposure controls for photographic cameras. More particularly, the invention relates to improvements in exposure controls of the type wherein one of the two exposure values (exposure time and aperture size) is determined automatically in response to determination of the other exposure value as a function of scene brightness. Still more particularly, the invention relates to improvements in exposure controls wherein a movable part is propelled to open or light-admitting position in response to impetus received from an impeller and wherein the movement of such movable part to open position is influenced by electromagnetic means as a function of scene brightness.

It is already known to provide a camera with an exposure control having a so-called diaphragm type shutter wherein a blade is moved to open position by an impeller and wherein the movement of such blade in response to impetus received from the impeller is influenced by an electromagnetic field of variable strength. The arrangement is normally such that the strength of the electromagnetic field varies as a function of scene brightness in order to furnish a larger aperture when the scene brightness is low and to furnish a smaller aperture when the intensity of scene light is higher. Each aperture size corresponds to a different exposure time because the blade is biased to closed position by a spring or the like and it takes less time to move the blade to closed position if the aperture size is small, i.e., if the electromagnetic field causes or allows the blade to reverse the direction of its movement after having covered a relatively small distance from closed position.

A drawback of the just described exposure controls is that an error in selection of the aperture size for a particular exposure is compounded by the error in selection of the exposure time. This is inherent in such types of exposure controls because, if the movable blade happens to define an aperture size which is inappropriate for a particular scene brightness, the exposure control automatically selects an inappropriate exposure time. Furthermore, the just described exposure controls cannot furnish relatively long exposure times unless the characteristics of the light measuring system therein are changed which involves considerable expenditures in additional parts and contributes to the initial cost of the exposure control.

SUMMARY OF THE INVENTION

It is an object of the present invention to provide a novel and improved exposure control which is of simple and compact design, which is rugged and reliable in operation, which can furnish very long or very short exposure times, and wherein improper selection of one exposure factor for a particular exposure cannot unduly influence the selection of the other exposure factor, or vice versa.

Another object of the invention is to provide an exposure control which can furnish long exposure times without necessitating a change in the characteristics of its light measuring system.

A further object of the invention is to provide an exposure control which is compact enough to be installed in still cameras and which can inform the operator, in one or more ways, when the scene brightness is unsatisfactory for making exposures with the camera held by hand.

An additional object of the invention is to provide an exposure control wherein the shutter opens in automatic response to selection of appropriate aperture size for a particular exposure.

A concomitant object of the invention is to provide an exposure control which can employ a very simple shutter and/or diaphragm but can still furnish a large number of aperture sizes and/or exposure times.

The improved exposure control comprises diaphragm means including vane means movable from a first (closed) position to a plurality of second positions in each of which the diaphragm means defines an aperture of different size, biasing means for urging the vane means to first position, shutter means movable from a closed to an open position upon completion of movement of the vane means to a second position, impeller means operative to propel the vane means from first position, control circuit means including photosensitive receiver means exposed to scene light and electromagnet means in circuit with the receiver means and energizable to select the second position of the vane means in response to operation of the impeller means so that the vane means assumes a given second position in which the diaphragm means defines an aperture whose size is a function of scene brightness, and holding means for maintaining the vane means in the given second position for an interval of time which is a fuction of the size of the aperture defined by the diaphragm means in the given second position of the vane means whereupon the biasing means is free to return the vane means to first position to thus complete the exposure.

The shutter means is normally held in closed position by a retaining means which can be disengaged therefrom by an adjusting means by way of the holding means on movement of the vane means to given second position to thus permit movement of the shutter means to open position.

The receiver means forms part of a branch circuit in the control circuit means. The sensitivity of the branch circuit is variable in response to movement of the vane means from first position and this branch circuit is arranged to determine the length of the interval during which the vane means remains in the given second position in dependency on the aperture size in the given second position of the vane means and in dependency on the corresponding sensitivity of the branch circuit.

The novel features which are considered as characteristic of the invention are set forth in particular in the appended claims. The improved exposure control itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENT

Figure 1:
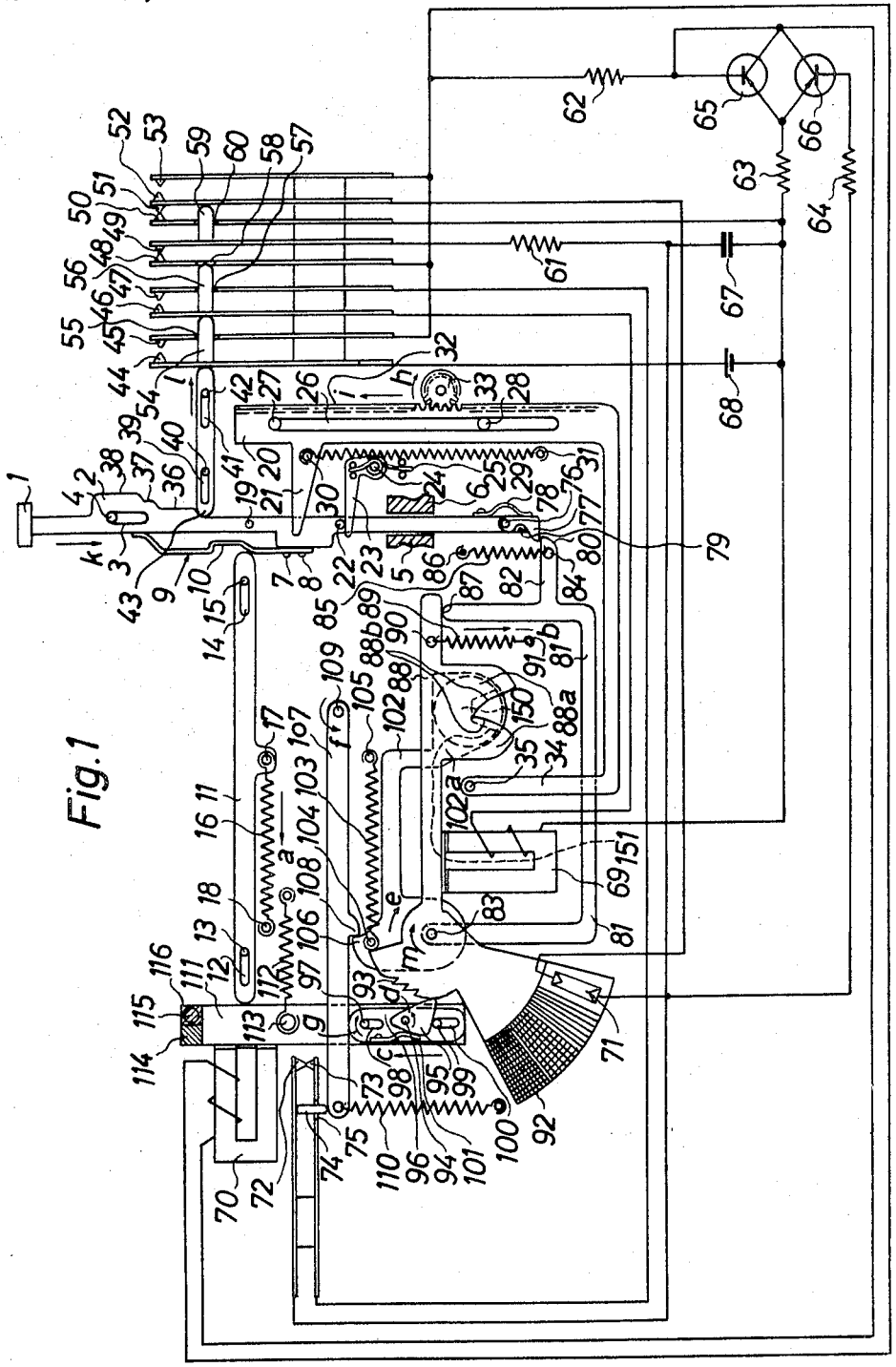
FIG. 1 is a diagrammatic view of an exposure control which embodies the invention, the release trigger being shown in starting position.

FIG. 1 illustrates an exposure control which is built into a photographic camera and comprises a reciprocable release trigger 2 having a knob 1 and provided with an elongated slot 3 for a guide pin 4 which is secured to the housing of the camera. The trigger 2 is further guided in stationary bearings 5 and 6. A leaf spring 9 is secured to one edge face of the trigger 2 by rivets or screws 7, 8; a median portion of this spring is formed with a notch or dent 10. An elongated motion transmitting bar 11 is provided with elongated slots 12, 14 for fixed guide pins 13, 15 which are secured to the housing. A helical spring 16 operates between a post 17 on the bar 11 and a fixed post 18 to bias the bar in a direction to the left as indicated by arrow a. The ends of the bar 11 bear against the leaf spring 9 and against a pivotable armature 111 which will be described later.

The trigger 2 has a projection in the form of a pin 19 which can be moved upwardly by the arm 21 of a cocking member here shown as a slide 20. A second projection or pin 22 of the trigger 2 is engaged by a pawl 23 which is turnable on a pin 24 of the camera housing and is biased by a torsion spring 25 so that it tends to move the trigger upwardly, as viewed in FIG. 1. The slide 20 has an elongated slot 26 for two spaced stationary guide pins 27, 28. A return spring 29 operates between a post 30 on the slide 20 and a post 31 which is secured to the housing. A portion of the slide 20 forms an elongated straight toothed rack 32 which meshes with a pinion 33; the pinion 33 is connected with or forms part of the film transporting mechanism and is rotated in the direction indicated by arrow h when the film transporting mechanism is operated in order to place a fresh film frame into registry with the objective 150. The rack 32 is then caused to move upwardly as indicated by the arrow i. The slide 20 has a second arm or extension 34 which carries a motion transmitting pin 35.

The aforementioned trigger 2 is further provided with three steps 36, 37, 38 which constitute three cams and can shift a horizontally reciprocable follower 43 which has two elongated slots 39, 41 for fixed guide pins 40, 42. The follower 43 can actuate a composite electric switch (hereinafter called selector switch) which includes five pairs of contacts 44–45, 46–47, 48–49, 50–51 and 52–53. The contact 44 carries a stud 54 which extends through a hole 55 of the contact 45 and can move the contact 46 against the contact 47 when the follower 43 moves in the direction indicated by arrow l. The contact 46 has a stud 56 which extends through a hole 57 of the contact 47 and can move the contact 49 away from the contact 48. The contact 49 has a stud 59 which extends through a hole 60 of the contact 50 and can move the contact 52 against the contact 53 by simultaneously moving the contact 51 away from the contact 50. A hole 58 in the contact 48 permits movement of the stud 56 against the contact 49. The selector switch including the contacts 44–53 and studs 54, 56, 59 forms part of an electronic control circuit which further includes fixed resistors 61, 62, 63, 64, two transistors 65, 66, a capacitor 67, a battery 68 or another suitable source of energy, two electromagnets 69, 70, a photosensitive receiver 71 and a circuit breaker switch including two contacts 72, 73. The contact 72 carries a stud 74 which extends through a hole 75 of the contact 73. Depending on the extent to which the trigger 2 is displaced from its starting position which is shown in FIG. 1, the follower 43 causes completion of different portions of the control circuit.

The lower end portion of the trigger 2 carries a shaft 76 for a cocking or tensioning pawl 77 which is biased by a torsion spring 78 so that it tends to turn in a clockwise direction and normally bears against a stop pin 79 of the trigger. When the trigger 2 moves upwardly to the position shown in FIG. 1, the pallet of the pawl 77 slides along a rounded edge face 80 provided on an impeller 81 whereby the pawl 77 pivots on the shaft 76 against the opposition of the spring 78. When the trigger 2 returns to starting position, the pallet of the pawl 77 bears against the top face of an extension or arm 82 on the impeller 81. The latter is pivotable on a shaft 83 which is affixed to the housing of the camera and its arm 82 carries a post 84 for one end of a strong spring 85 the other end of which is attached to a fixed post 86 on the housing. A second arm 87 of the impeller 81 abuts against the underside of a lever 88 which forms part of a simple main diaphragm and is biased by a helical spring 89 which operates between a post 90 of the lever 88 and a fixed post 91. The spring 89 tends to pivot the lever 88 about the shaft 83 in a clockwise direction (arrow b). The vane 88a of the diaphragm is rigid with the lever 88 and has a substantially V-shaped or horn-shaped cutout 88b. In the illustrated closed or first position of the vane 88a, its cutout 88b overlies a fixed diaphragm vane 151 of the diaphragm. The vane 151 overlies a portion of the objective 150, i.e., the vane 151 cooperates with the vane 88a to prevent the light from reaching an unexposed film frame when the vane 88a assumes the first position shown in FIG. 1.

The lever 88 for the diaphragm vane 88a carries an auxiliary diaphragm 92 which comprises a set of grey filters of increasing density. The filters are movable in front of the photosensitive receiver 71 so as to reduce the intensity of light which can reach the receiver in dependency on the angular position of the lever 88 and hence in dependency on the size of the aperture which is defined by the vanes 88a and 151. These filters serve to change the sensitivity of a branch circuit in the control circuit. The auxiliary diaphragm including the filters 92 is rigid with a set of teeth 93 which turn with the lever 88 and vane 88a about the shaft 83 and can be engaged by the tang of an arresting or holding pawl 95 which is pivotable on a pin 94 mounted on an adjusting or displacing member 96 which is reciprocable in and counter to the direction indicated by arrow c. The adjusting member 96 has slots 98, 100 for guide pins 97, 99. A leaf spring 101 biases the pawl 95 and tends to turn it on the pin 94 in the direction indicated by arrow d.

A shutter lever 102 is pivotable on the shaft 83 for the impeller 81 and lever 88 and is biased by a helical spring 103 which tends to turn it in a clockwise direction (arrow e). This spring operates between a post 104 of the lever 102 and a fixed post 105. A blade 102a of the lever 102 overlies the objective 150 when the lever 102 assumes the closed position shown in FIG. 1. The lever 102 further comprises a tooth or projection 106 which can engage a complementary projection or tooth 108 on a retaining lever 107; the latter is turnable on a fixed shaft 109 and is biased by a helical spring 110 which tends to turn it in a counterclockwise direction (arrow *f*). The spring 110 urges the lever 107 against the adjusting member 96. This adjusting member is movable with reference to the aforementioned armature 111 for the electromagnet 70, and the armature 111 is pivotable on the pin 97.

A further helical spring 112 operates between a fixed post and a post 113 of the armature 111 and tends to pivot the armature in a clockwise direction (arrow *g*). FIG. 1 illustrates the armature 111 in an end position in which the armature is adjacent to the poles of the electromagnet 70. The armature is held in such position by the spring 16 and by the spring 9 which maintains the bar 11 in its left-hand end position. The upper end portion of the armature 111 carries a red indicator 114 and a green indicator 115. These indicators serve to indicate the lighting conditions. In the illustrated position of the armature 111, the green indicator 115 is in registry with the lens 116 of the view finder.

Figure 4:
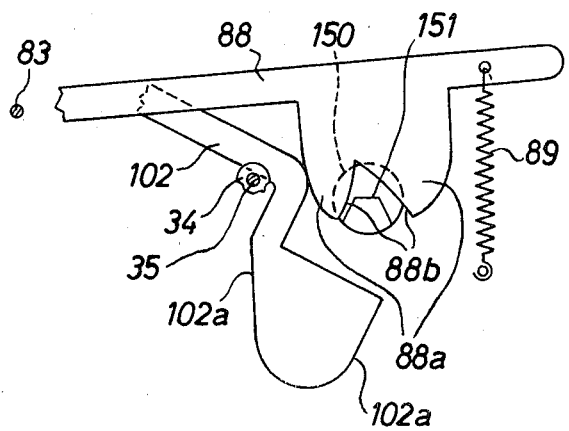
FIG. 4 shows the diaphragm and shutter of the exposure control in open positions.

The parts 88, 88*a*, 102 102*a* and 151 are shown in greater detail in FIG. 4 which illustrates the diaphragm and shutter in open positions. Thus, the vanes 88*a*, 151 define an aperture which admits light to a film frame. The blade 102*a* of the shutter is out of registry with the objective 150. The vane 88*a* assumes a given second position in which the aperture size is a function of scene brightness.

The operation is as follows:

Prior to making an exposure, the user transports the film so as to place a fresh film frame into registry with the objective 150. This results in rotation of the pinion 33 (arrow *h*) whereby the pinion moves the rack 32 upwardly (arrow *i*) and prepares the exposure control for operation. While the slide 20 moves upwardly, its arm 21 engages the projection 19 and moves the trigger 2 to the starting position shown in FIG. 1. At the same time, the pin 35 on the second arm 34 of the slide 20 moves the shutter lever 102 in a counterclockwise direction (counter to that indicated by arrow *e*) whereby the projection 106 of the lever 102 engages the projection 108 of the retaining lever 107. The bias of the torsion spring 25 is strong enough to enable the pawl 23 to hold the trigger 2 in the illustrated starting position after the slide 20 descends under the action of its return spring 29. The drive between the lever or wheel of the film transporting mechanism and the pinion 33 includes a one-way clutch or the like which insures that the pinion can rotate freely in a counterclockwise direction and thus permits the slide 20 to descend as soon as the film transporting mechanism places a fresh film frame into registry with the objective 150.

In the illustrated starting position of the trigger 2, the leaf spring 9 bears against the right-hand end of the bar 11 and causes the latter to maintain the armature 111 in abutment with or very close to the pole of the electromagnet 70. Thus, the spring 9 then assists the spring 16 which latter permanently biases the bar 11 in the direction indicated by arrow *a*. The spring 112 is stronger than the spring 16 so that the armature 111 pivots away from the electromagnet 70 when the trigger 2 places the notch 10 of the leaf spring 9 into registry with the right-hand end of the bar 11. Such pivotal movement of the armature (arrow *g*) takes place when the bar 11 is not biased by the spring 9 and when the force produced by the electromagnet 70 is too weak to compensate for the difference between the forces of springs 16 and 112. The just described situation will arise if the current flowing in the winding of the electromagnet 70 is very weak. The armature 111 then pivots in the direction indicated by arrow *g* as soon as the user depresses the trigger 2 to the extent necessary to place the notch 10 of spring 9 into registry with the adjoining end of the bar 11. The current flow in the winding of the electromagnet 70 is weak when the intensity of scene light is low, i.e., when the receiver 71 offers a substantial resistance to the flow of current.

Figure 2:
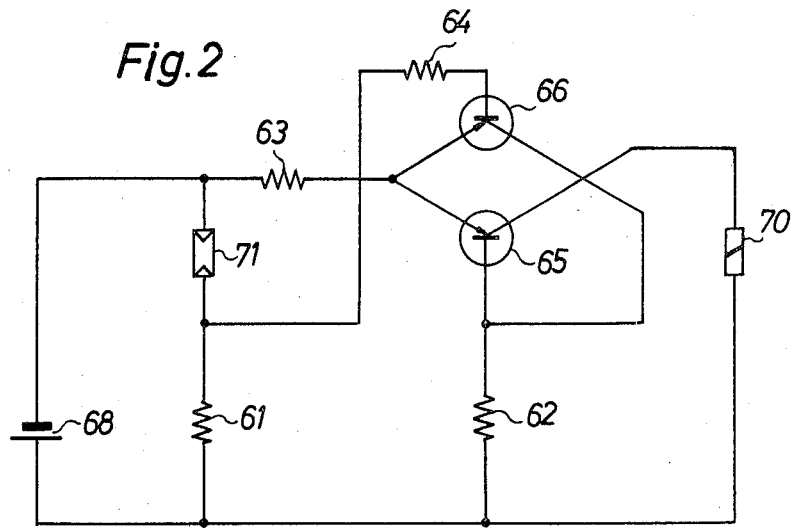
FIG. 2 illustrates a first branch of the control circuit in the exposure control of FIG. 1.

During the initial stage of movement of the trigger 2 from the illustrated starting position, the cam 36 shifts the follower 43 in a direction to the right (arrow *l*) and moves the contact 44 against the contact 45. This completes that portion or branch of the electronic control circuit which is illustrated in FIG. 2. The receiver 71 forms with the fixed resistor 61 a voltage divider whose tap is connected to the base of the transistor 66 by way of the fixed resistor 64. The transistors 65, 66 together form a switching circuit. The base of the transistor 65 is connected to one pole of the battery 68 by way of the fixed resistor 62. The common emitter of the transistors 65, 66 and the base resistor 62 of the transistor 65 are selected in such a way that, when the intensity of scene light is high, i.e., when the resistance of the receiver 71 is low, the transistor 65 conducts current to permit energization of the electromagnet 70 whose winding is in series with the collector of the transistor 65. The electromagnet 70 then attracts the armature 111 and overcomes he bias of the spring 112 so that the armature 111 remains in the position shown in FIG. 1 even if the notch 10 of the leaf spring 9 registers with the right-hand end of the bar 11 in response to partial depression of the trigger 2. The magnitude of the force which the electromagnet 70 exerts in order to attract the armature 111 is a function of scene brightness.

When the intensity of scene light is low, the resistance of the receiver 71 is sufficiently high to cause the transistor 65 to block the flow of current, i.e., the transistor 66 then conducts current whereby the electromagnet 70 remains deenergized. The bias of the spring 112 then suffices to pivot the armature 111 in the direction indicated by arrow *g* as soon as the notch 10 moves into registry with the bar 11. The bar 11 enters the notch 10 and the red indicator 114 on the armature 111 moves into registry with the view finder lens 116 to indicate to the user that the intensity of scene light is unsatisfactory. Furthermore, the right-hand end of the bar 11, which then extends into the notch 10 of the spring 9, offers a marked resistance to further depression of the trigger 2 so that the user immediately detects such resistance and knows that the scene brightness is low even if he or she fails to note the red indicator 114. If the user decides against an exposure, the knob 1 is simply released whereby the torsion spring 25 causes the pawl 23 to return the trigger 2 to the starting position of FIG. 1. However, if the user decides to use a tripod for the camera, the exposure can be made even if the scene brightness is so low that the indicator 114 registers with lens 116; the user then simply exerts upon the knob 1 a pressure which suffices to overcome the added resistance which develops when the bar 11 enters the notch 10 of the leaf spring 9. The manner in which the exposure is made in response to full depression of the trigger 2 to an end position will be understood upon perusal of the next-following part of this description.

If the scene brightness is sufficient to cause requisite energization of the electromagnet 70 when the follower 43 moves the contact 44 against the contact 45, i.e., when the transistor 65 conducts current, the electromagnet 70 attracts the armature 111 and continues to hold it in the position of FIG. 1 even when the notch 10 of the spring 9 registers with the bar 11. Thus, the user knows that the scene brightness is satisfactory for an exposure with the camera held by hand because the resistance to further depression of the trigger 2 does not increase suddenly when the cam 36 moves downwardly below the left-hand end of the follower 43. Furthermore, the green indicator or flag 115 remains in registry with the lens 116. This is one of the two indications that the exposure can be made with the camera held by hand.

Figure 3:
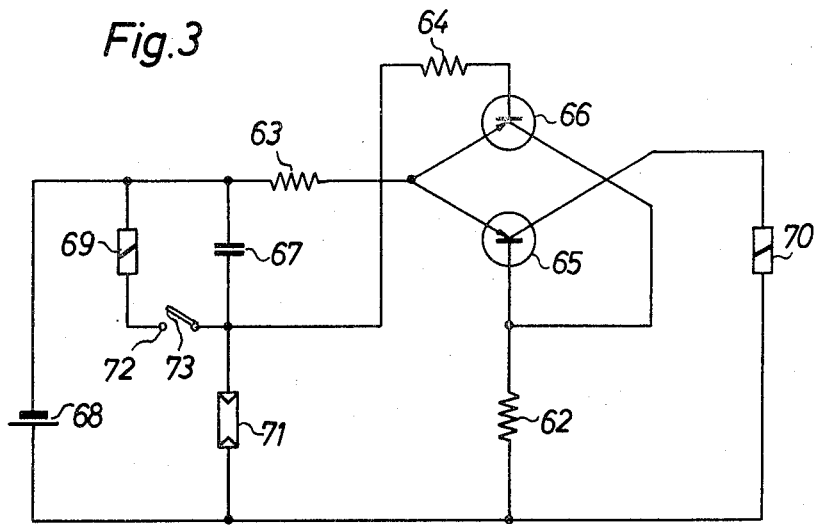
FIG. 3 illustrates a second branch of the control circuit.

The user then continues to press the knob 1 so as to move the trigger 2 to its lower end position. The follower 43 travels first along the cam 37 and thereupon engages the cam 38 which causes it to change the condition of the control circuit. That portion or branch of the control circuit which is completed in response to full depression of the trigger 2 is shown in FIG. 3. The follower 43 then causes the contacts 44, 46 and 52 to respectively engage the contacts 45, 47 and 53. The contacts 48 and 50 are respectively disengaged from the contacts 49 and 51. The energization of electromagnet 69 (FIG. 3) is a function of scene brightness, i.e., a function of the resitstance of the receiver 71 which is in series with the electromagnet 69 and battery 68 because the circuit breaker switch including the contacts 72, 73 is then closed. The electromagnet 69 is in parallel with and bridges the capacitor 67.

While the trigger 2 moves to its lower end position (arrow k), the pawl 77 pushes the arm 82 of the impeller 81 downwardly whereby the impeller turns in the direction indicated by arrow m. The spring 85 stores energy and is free to propel the impeller 81 upwardly (in a counterclockwise direction, as viewed in FIG. 1) as soon as the pallet of the pawl 77 moves beyond the arm 82. Such propulsion of the impeller 81 back to the position shown in FIG. 1 causes the arm 87 to strike against the lever 88 and the lever 88 is propelled in a counterclockwise direction to the extent determined by the force of the electromagnet 69. The lever 88 is the armature of this electromagnet. The impetus transmitted by the impeller 81 to the lever 88 are of predetermined and unchanging magnitude so that the angular displacement of the lever 88 and vane 88a from the position shown in FIG. 1 is a function of scene brightness, i.e., a function of the attracting force produced by the electromagnet 69. If the force of the electromagnet 69 is strong (i.e., if the scene brightness is high), the angular displacement of the lever 88 is small and the vanes 88a, 151 define an aperture of small size. If the scene brightness is low, the force produced by the electromagnet 69 is weaker and the angular displacement of the lever 88 and vane 88a is greater so that the vanes 88a, 151 define an aperture of greater size. The aperture size is determined by the vanes 88a, 151.

When the lever 88 reaches the end of its angular displacement away from the position shown in FIG. 1, i.e., when the vane 88a assumes one of its second positions, the tang of the holding pawl 95 engages the nearest tooth 93 and prevents return movement of the vane 88a to first position. The spring 89 stores energy during movement of the lever 88 away from the illustrated first position and tends to pivot the lever 88 in the direction indicated by arrow b. Such bias of the spring 89 causes one of the teeth 93 to move the adjusting member 96 with reference to the armature 111 (arrow c). The adjusting member 96 pivots the retaining lever 107 whereby the projection 108 releases the projection 106 of the lever 102. At the same time, the lever 107 moves the stud 74 upwardly and opens the circuit breaker switch by moving the contact 72 away from the contact 73. As shown in FIG. 3, opening of the circuit breaker switch results in deenergization of the electromagnet 69 and causes a current to flow through the capacitor 67 and receiver 71. The latter forms with the capacitor an R-C unit whose resistance controls the operation of transistors 65, 66 and its time constant determines the delay with which the electromagnet 70 is deenergized subsequent to opening of the circuit breaker switch. Such deenergization of the electromagnet 70 effects completion of the exposure. Since the auxiliary diaphragm 92 controls the intensity of light which can reach the receiver 71, the exposure time is invariably a function of the aperture size because the angular displacement of the lever 88 determines the position of the diaphragm 92 with reference to the receiver. In other words, the exposure time is always a function of the aperture size. The exposure time begins when the shutter blade 102a moves to open position in response to movement of the diaphragm vane 88a to that second position which is determined by the electromagnet 69 as a function of scene brightness prior to covering of the receiver 71 by the auxiliary diaphragm 92. The exposure time is terminated when the holding pawl 95 releases the arm 88 so that the vane 88a can return to the first position shown in FIG. 1 under the action of biasing means 89. In other words, the blade 102a merely serves to expose the aperture defined by vanes 88a, 151 to scene light and the blade 102a thereupon remains in open position until the release trigger 2 returns to the starting position shown in FIG. 1. Return movement of the blade 102a to closed position is effected by the pin 35 on the arm 34 of the slide 20.

When the electromagnet 70 is deenergized, the armature 111 pivots under the action of spring 112 (about the pin 97) in the direction indicated by arrow q. The holding pawl 95 is caused to move away from the teeth 93 and permits the spring 89 to return the lever 88 and vane 88a to first position.

If desired, the electromagnet 69 can be positioned to oppose the anticlockwise rotation of the impeller 81 under the action of spring 85 with a force which is a function of scene brightness. The angular displacement of the lever 88 and vane 88a is then the same as in the just described embodiment, i.e., the aperture size is again a function of scene brightness and the auxiliary diaphragm 92 again insures that the exposure time is a function of the aperture size.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an exposure control for photographic cameras, a combination comprising diaphragm means including vane means movable from a first position to a plurality of second positions in each of which said diaphragm means defines an aperture of different size; biasing means for urging said vane means to first position; shutter means movable from closed to open position on movement of said vane means to a second position; impeller means operative to propel said vane means from first position; control circuit means including photosensitive receiver means exposed to scene light and electromagnet means in circuit with said receiver means and energizable to select the second position of said vane means in response to operation of said impeller means so that said vane means assumes a given second position in which said diaphragm means defines an aperture whose size is a function of scene brightness; and holding means for maintaining said vane means in said given second position for an interval of time which is a function of the size of aperture defined by said diaphragm means whereupon said biasing means is free to return the vane means to first position to complete the exposure.

2. A combination as defined in claim 1, further comprising retaining means for normally maintaining said shutter means in closed position and adjusting means for disengaging said retaining means from said shutter means by way of said holding means on movement of said vane means to said given second position to thus permit movement of said shutter means to open position.

3. A combination as defined in claim 1, wherein said photosensitive receiver means forms part of a branch circuit in said control circuit means and wherein the sensitivity of said branch circuit is variable, and further comprising means for varying the sensitivity of said branch circuit in response to movement of said vane means from first position, said branch circuit being arranged to determine the length of said interval in dependency on the aperture size in the given second position of said vane means and in dependency on the corresponding sensitivity of said branch circuit.

4. A combination as defined in claim 3, wherein said branch circuit further comprises a circuit breaker switch which is actuated in response to movement of said vane means to said given second position.

5. A combination as defined in claim 4, wherein said branch circuit further comprises second electromagnet means which is deenergized on actuation of said switch to thereby permit disengagement of said holding means from said vane means.

6. A combination as defined in claim 3, wherein the means for varying the sensitivity of said branch circuit comprises auxiliary diaphragm means arranged to change the amounts of scene light which can reach said receiver means in dependency on the extent of movement of said vane means from first position.

7. A combination as defined in claim 1, wherein said vane means is rigid with a set of teeth and said holding means comprises spring-biased pawl means engaging with one of said teeth to thereby hold the vane means in a second position on operation of said impeller means.

8. A combination as defined in claim 7, further comprising movable adjusting means supporting said pawl means and retaining means for normally holding said shutter means in closed position, said adjusting means being arranged to disengage said retaining means from said shutter means on engagement of said pawl means with one of said teeth.

9. A combination as defined in claim 1, wherein said control circuit means further comprises second electromagnet means energizable to maintain said vane means in said given second position by way of said holding means, a transistorized switching circuit for energizing said second electromagnet means, and an R–C unit for energizing said second electromagnet means by way of said switching circuit.

10. A combination as defined in claim 9, wherein said receiver means constitutes the resistor of said R–C unit.

11. A combination as defined in claim 9, wherein said second electromagnet means comprises an armature pivotable in response to deenergization of said second electromagnet means and adjusting means for effecting disengagement of said holding means from said vane means in response to pivoting of said armature.

12. A combination as defined in claim 1, further comprising resilient means for pivoting said armature in response to deenergization of said second electromagnet means.

13. A combination as defined in claim 11, further comprising indicator means indicative of scene brightness and connected for movement with said armature.

14. A combination as defined in claim 13, wherein said second electromagnet means is in circuit with said receiver means and the extent of its energization is a function of scene brightness, said indicator means comprising a pair of indicators one of which is indicative of satisfactory and the other of which is indicative of unsatisfactory scene brightness.

15. A combination as defined in claim 1, wherein said electromagnet means forms part of a first branch circuit which determines the size of the aperture and said control circuit means further comprises a second branch circuit which determines the delay with which said holding means releases said vane means for movement to first position, and selector switch means operative to complete said branch circuits in a predetermined sequence.

16. A combination as defined in claim 1, wherein said control circuit means further comprises second electromagnet means energizable to maintain said holding means in engagement with said vane means and a switching circuit having a transistor whose collector is connected with said second electromagnet means.

17. A combination as defined in claim 1, further comprising release trigger means movable from a starting position, said control circuit means further comprising a transistorized switching circuit and a voltage divider including said receiver means and a fixed resistor and having a tap for supplying voltage to said switching circuit to thereby energize said electromagnet means as a function of scene brightness.

18. A combination as defined in claim 17, wherein said control circuit means further comprises capacitor means forming with said receiver means an R–C unit in response to a predetermined movement of said trigger means from starting position.

19. A combination as defined in claim 18, wherein said electromagnet means is in series with said receiver means when said capacitor means and said receiver means form said R–C unit and wherein said electromagnet means then bridges said capacitor means.

20. A combination as defined in claim 19, wherein said trigger means is movable to an end position in which said electromagnet means is deenergized and wherein said control circuit means further comprises second electromagnet means which is energized while said vane means assumes said given second position and whose deenergization effects disengagement of said holding means from said vane means.

References Cited

UNITED STATES PATENTS

| | | |
|---|---|---|
| 2,978,970 | 4/1961 | Fahlenberg. |
| 3,205,795 | 9/1965 | Grey. |
| 3,286,610 | 11/1966 | Fahlenberg. |
| 3,416,421 | 12/1968 | Biedermann et al. |
| 3,444,794 | 5/1969 | Wasieleuski et al. __ 95—64 XR |
| 3,455,218 | 7/1969 | Eagle et al. |

JOHN M. HORAN, Primary Examiner

J. F. PETERS, JR., Assistant Examiner

U.S. Cl. X.R.

95—53, 64